(12) United States Patent
Howard

(10) Patent No.: US 7,290,819 B2
(45) Date of Patent: Nov. 6, 2007

(54) SECURE STORAGE FOR GOLF BAG IN PICKUP

(76) Inventor: Jeffrey W. Howard, 158 Natures Dr., St. Mary's, GA (US) 31558

( * ) Notice: Subject to any disclaimer, the term of this patent is extended or adjusted under 35 U.S.C. 154(b) by 0 days.

(21) Appl. No.: 11/511,227

(22) Filed: Aug. 29, 2006

(65) Prior Publication Data

US 2007/0046057 A1    Mar. 1, 2007

Related U.S. Application Data

(60) Provisional application No. 60/712,851, filed on Sep. 1, 2005.

(51) Int. Cl.
*B60R 9/06* (2006.01)
*B60R 9/08* (2006.01)

(52) U.S. Cl. ............... 296/37.6; 296/37.1; 224/404

(58) Field of Classification Search ............ 296/37.1, 296/37.6, 37.14; 224/403, 404, 281, 554, 224/537
See application file for complete search history.

(56) References Cited

U.S. PATENT DOCUMENTS

| | | | |
|---|---|---|---|
| 4,705,315 A | 11/1987 | Cherry | |
| 4,733,898 A | 3/1988 | Williams | |
| 4,752,095 A * | 6/1988 | Brady | 296/37.6 |
| 4,909,558 A * | 3/1990 | Roshinsky | 296/37.6 |
| 4,946,215 A * | 8/1990 | Taylor | 296/37.6 |
| 5,121,959 A * | 6/1992 | King | 296/37.6 |
| 5,297,707 A | 3/1994 | Weber | |
| 5,588,631 A | 12/1996 | Yee | |
| 5,924,616 A * | 7/1999 | Shives | 224/404 |
| 5,934,725 A * | 8/1999 | Bowers | 296/26.09 |
| 5,964,492 A * | 10/1999 | Lyon | 296/37.6 |
| 6,007,128 A * | 12/1999 | Hines, Jr. | 296/37.6 |
| 6,264,083 B1* | 7/2001 | Pavlick et al. | 224/404 |
| 6,318,780 B1* | 11/2001 | St. Aubin | 296/26.09 |
| 6,354,647 B1* | 3/2002 | Voves | 296/37.6 |
| 6,460,744 B2* | 10/2002 | Lance et al. | 224/404 |
| 6,464,277 B2* | 10/2002 | Wilding | 296/37.6 |
| 6,554,169 B1* | 4/2003 | Furlong | 224/404 |
| 6,629,714 B2* | 10/2003 | Campbell | 296/37.6 |
| 6,811,068 B2* | 11/2004 | Johnson | 224/404 |
| 6,866,316 B1* | 3/2005 | Harder et al. | 296/26.09 |
| 6,945,580 B1* | 9/2005 | Hentes | 296/37.6 |
| 7,052,066 B2* | 5/2006 | Emery et al. | 296/37.1 |
| 7,083,219 B1* | 8/2006 | Gregory | 296/100.12 |
| 7,090,275 B2* | 8/2006 | Pero | 296/37.6 |
| 7,128,356 B2* | 10/2006 | Bassett | 296/37.6 |
| 7,185,935 B1* | 3/2007 | Magarro | 296/37.6 |

* cited by examiner

*Primary Examiner*—D. Glenn Dayoan
*Assistant Examiner*—Greg Blankenship
(74) *Attorney, Agent, or Firm*—Richard C. Litman

(57) ABSTRACT

A storage container adapted to be mounted to the bed of a pick-up truck. The container is designed to house golf paraphernalia, especially a golf bag (including a full array of clubs) and other golf equipment such as shoes. The container is securely mounted to the bed of the pick-up, but can be quickly and easily slid over the tailgate to allow for easy access. The container is fabricated from hard plastic or similar light-weight, rigid, weatherproof material. A hinged cover allows easy access to the interior of the container. The tailgate end of the bottom half of the container is provided with a hinged section to allow for easy loading and unloading of the golf paraphernalia. Wheels are mounted on the bottom of the container to permit portability if desired.

18 Claims, 9 Drawing Sheets

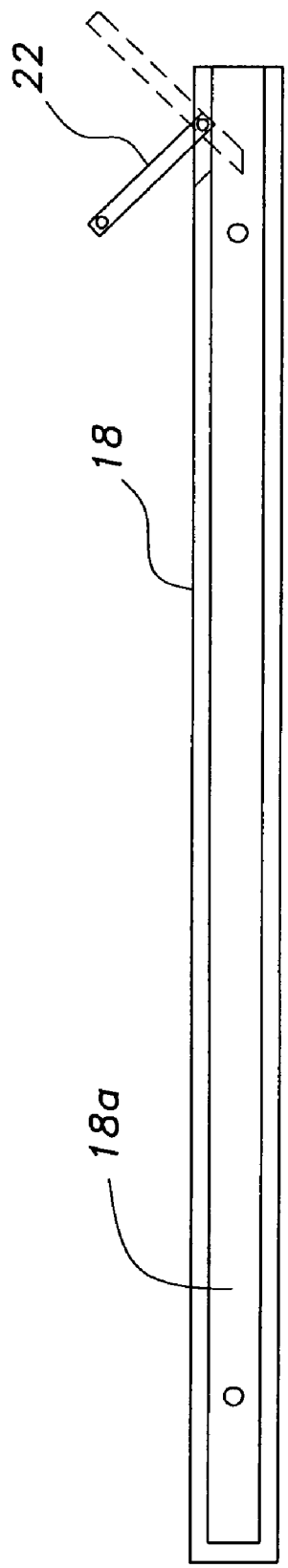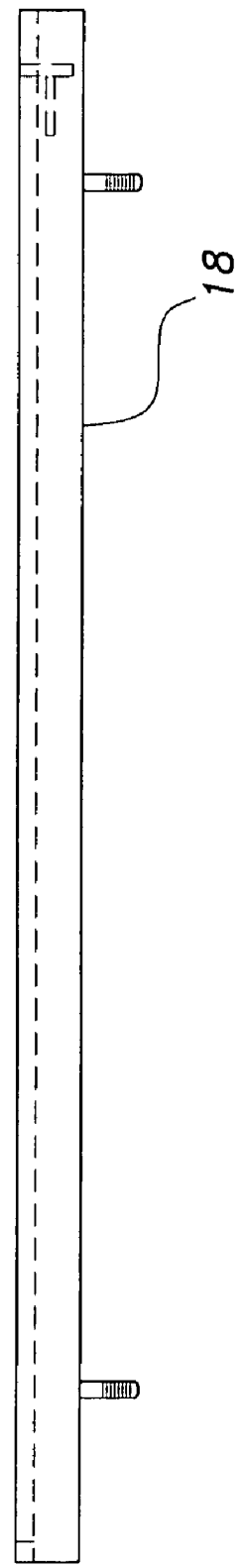
Fig. 4A
Fig. 4B

SECURE STORAGE FOR GOLF BAG IN PICKUP

CROSS-REFERENCE TO RELATED APPLICATION

This application claims the benefit of U.S. Provisional Patent Application Ser. No. 60/712,851, filed Sep. 1, 2005.

BACKGROUND OF THE INVENTION

1. Field of the Invention

The present invention generally relates to storage containers. More specifically, the present invention is drawn to a storage container for transporting and securing golf paraphernalia in the bed of a pick-up truck.

2. Description of the Related Art

Golf is a sport and hobby enjoyed by millions of people from all socio-economic levels. However, clothing and equipment costs, green fees and other associated fees take a monetary bite out of even a middle class income. It is thus essential that most players have a secure and convenient way to transport their golfing equipment to prevent damage and loss. In the past, the golf equipment was usually transported in the trunks of automobiles or in the rear of the family van. Recently however, another vehicle, the pick-up truck, has become a mainstay for the transportation of a variety of equipment.

Once relegated to rural areas, the pick-up truck has become an increasingly popular mode of transportation in urban and suburban communities. It is no rarity to see dozens of pick-up trucks in the parking lots of public golf courses and exclusive country clubs. It would certainly be a boon if one's golf equipment could be conveniently transported on the bed of a pick-up in a secure manner and still maintain full use of the bed when desired.

The related art is rife with devices for storing and transporting golf equipment. Pertinent samples of such related art are cited and identified in the accompanying IDS document. However, none of the identified and cited related art, taken either singly or in combination, is seen to disclose a container for storing and securing golf equipment on the bed of a pick-up truck as will subsequently be described and claimed in the instant application.

SUMMARY OF THE INVENTION

The present invention is drawn to a storage container adapted to be mounted to the bed of a pick-up truck. The container is designed to house golf paraphernalia, especially a golf bag (including a full array of clubs) and other golf equipment such as shoes. The container is securely mounted to the bed of the pick-up, but can be slid over the tailgate to allow for easy access and can be easily un-mounted for full use of the truck bed. The container is fabricated from hard plastic or similar light-weight, rigid, weatherproof material. A hinged cover allows easy access to the interior of the container and incorporates a sliding lock mechanism which secures both halves of the container without needing other special equipment. Wheels are mounted on the bottom of the container to permit portability if desired. The tailgate end of the bottom portion of the container is provided with a hinged section to allow for easy loading and unloading of the golf paraphernalia.

Accordingly, the present invention provides a secure means for storing and transporting bags, clubs, shoes, balls and other golf-related items on the bed of a pick-up truck. It is obvious that other types of equipment, unrelated to golf, could also be housed in the container if desired.

The invention provides for improved elements thereof in an arrangement for the purposes described that are inexpensive, dependable and fully effective in accomplishing their intended purposes.

A clear understanding of the present invention will become readily apparent upon further review of the following specification and drawings.

BRIEF DESCRIPTION OF THE DRAWINGS

FIG. 4A is a top view of a single slide channel according to the present invention.

FIG. 4B is a side view of a single slide channel according to the present invention.

Similar reference characters denote corresponding features consistently throughout the attached drawings.

DETAILED DESCRIPTION OF THE PREFERRED EMBODIMENTS

Figure 1:
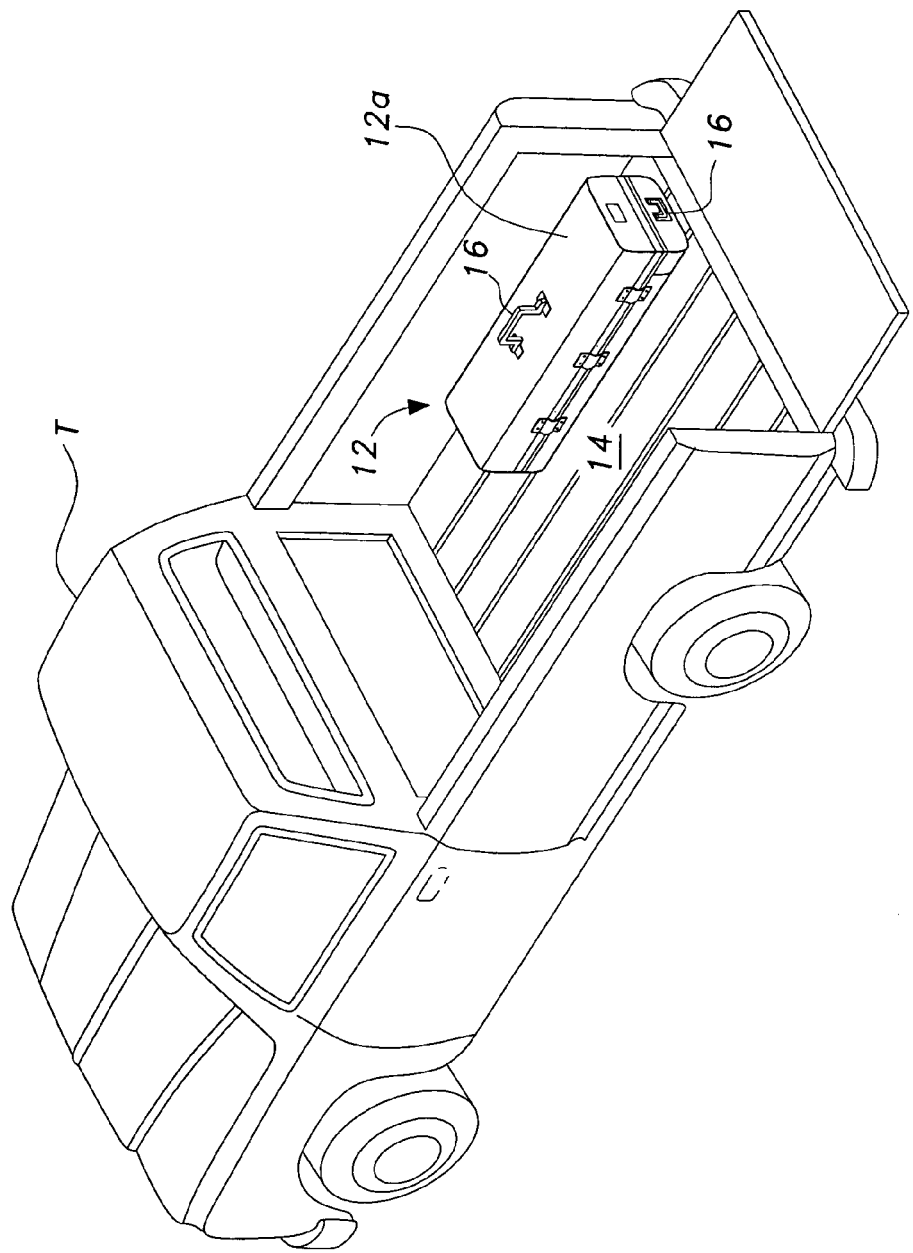
FIG. 1 is an environmental, perspective view of a storage container for a golf bag mounted to the bed of a pick-up truck according to the present invention.
Figure 2:
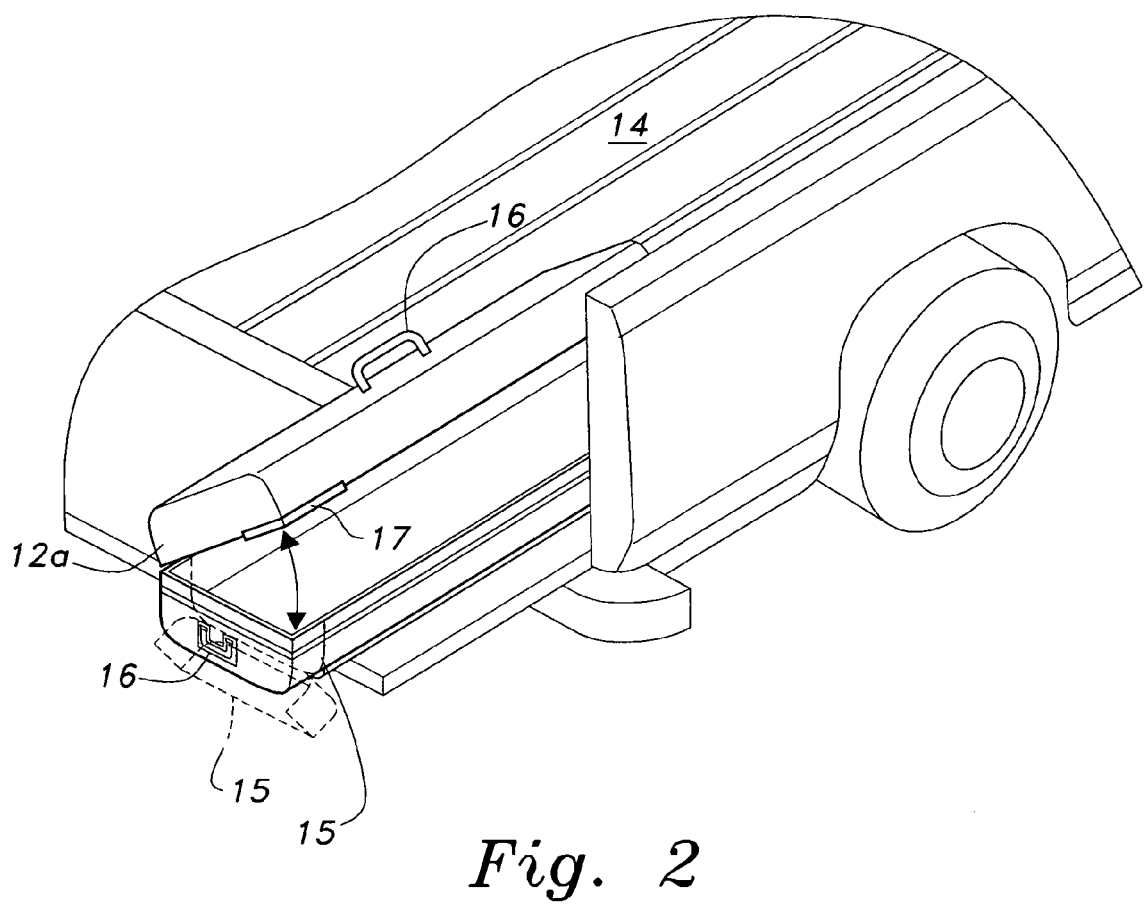
FIG. 2 is an environmental, perspective view of a storage container for a golf bag in an extended position on the bed of a pick-up truck according to the present invention.
Figure 3:
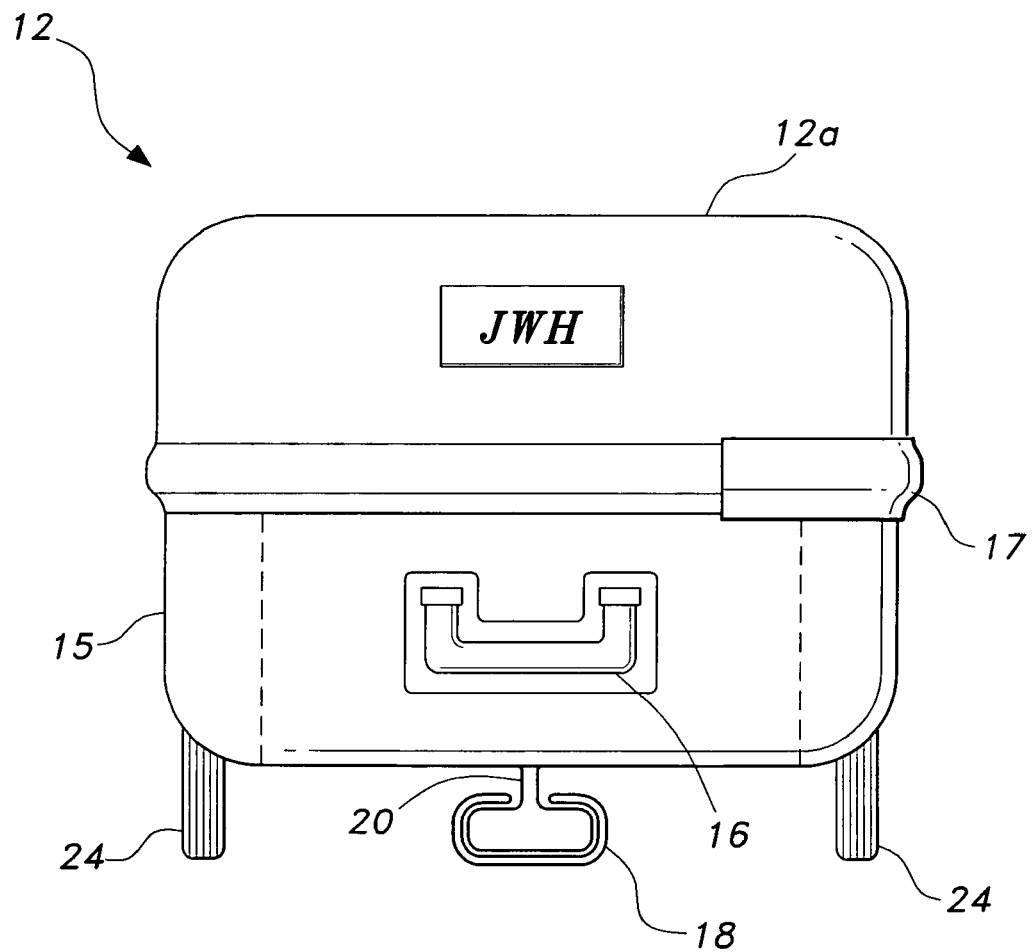
FIG. 3 is an end view of a first embodiment of the storage container mounted on a single slide channel according to the present invention.
Figure 5:
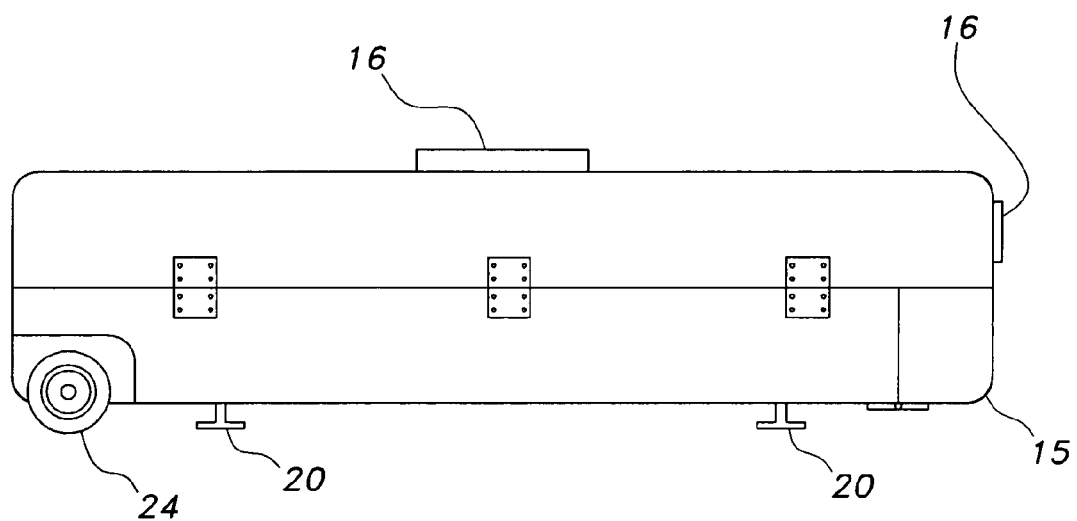
FIG. 5 is a side view of a first embodiment of the storage container according to the present invention.

Attention is first directed to FIGS. 1 and 2 wherein the storage container 12 of the present invention is shown disposed in storage position on the bed 14 of pick-up truck T. In FIG. 2, container 12 is in an extended in-use position having been slid over the tailgate of pick-up truck T. At its proximate end, the bottom portion has a hinged section 15 to provide for easy access when the container is in its extended position. Container 12 is equipped with a hinged lid 12a and an array of pivoting handles 16 to provide for easy access and movement. Lid 12a is provided with a conventional slide, locking clasp 17 on the side of the container opposite the hinges for securing the lid to the bottom portion. Lid 12a overlaps the bottom portion of the container to maintain weatherproof integrity on the inside of the container.

As best seen in FIGS. 3, 4A, 4B and 5, a first embodiment of the container 12 is designed for slidable mounting to a single slide channel 18, which channel is mounted to the bed 14 of the pick-up truck. At least two slide extensions 20 are disposed on the exterior of the bottom of the container 12. Extensions 20 are substantially encased in channel 18 for sliding movement therein. Slide channel 18 may be attached to the bed in any convenient and secure manner (screws, nuts and bolts, welds, etc.). A locking mechanism 22 is disposed at the open end of the channel nearest the tailgate to prevent unauthorized removal of the container. The end of the channel nearest the cab is closed. Recessed wheels 24 are positioned on the bottom of the container to allow for easy portability when it is desired to utilize the container outside of the truck. The wheels may also function to enhance sliding movement on the truck bed.

Figure 6:
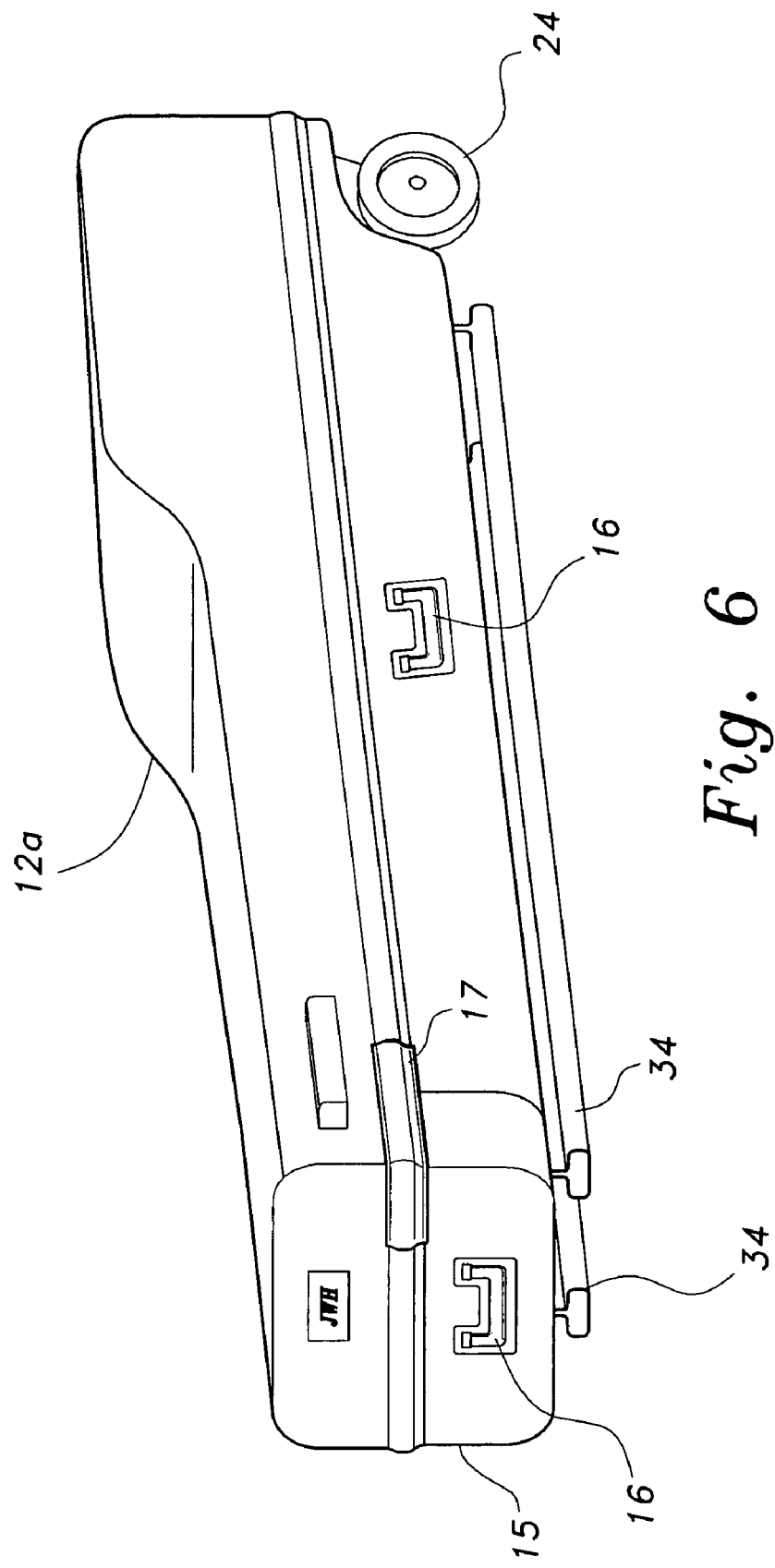
FIG. 6 is a perspective view of a second embodiment of the storage container mounted on parallel slide channels according to the present invention.
Figure 7:
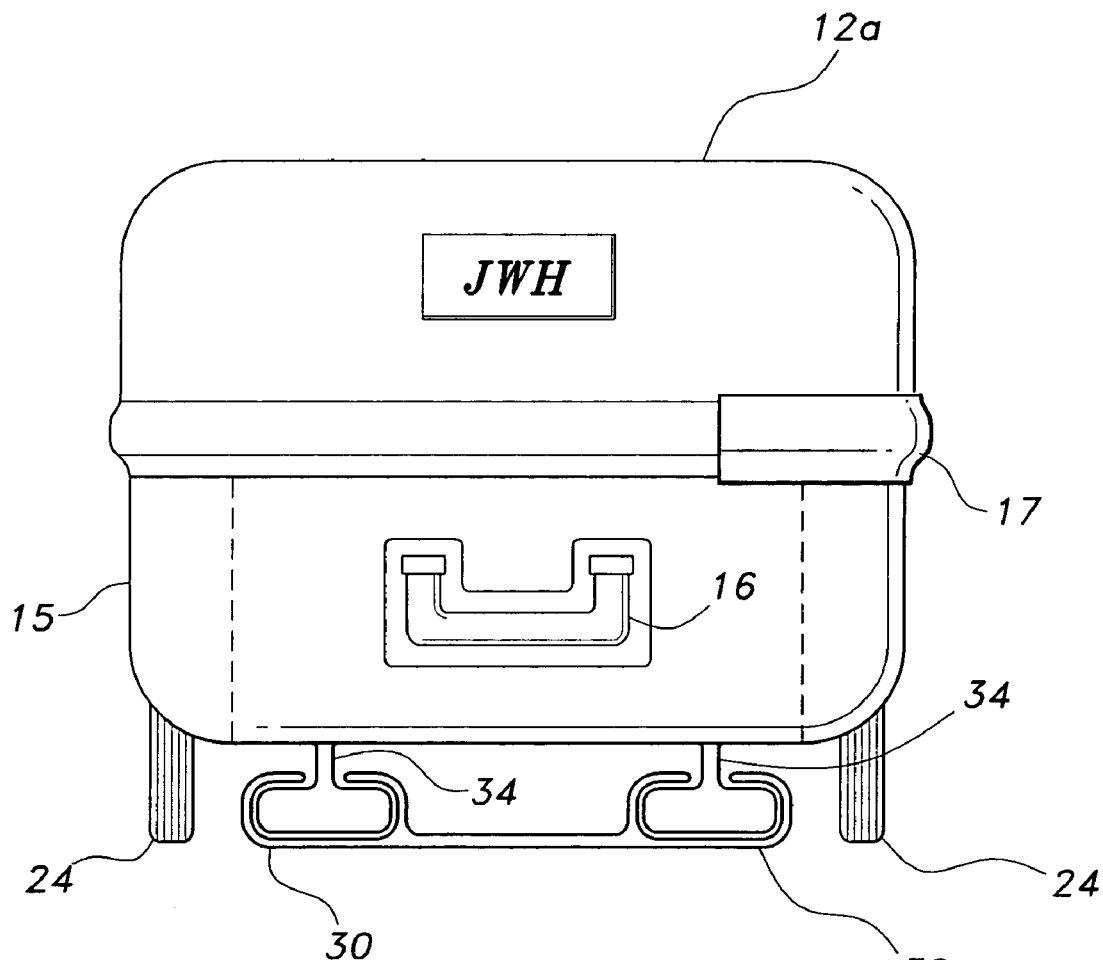
FIG. 7 is an end view of a second embodiment of the storage container mounted on parallel slide channels according to the present invention.
Figure 8:
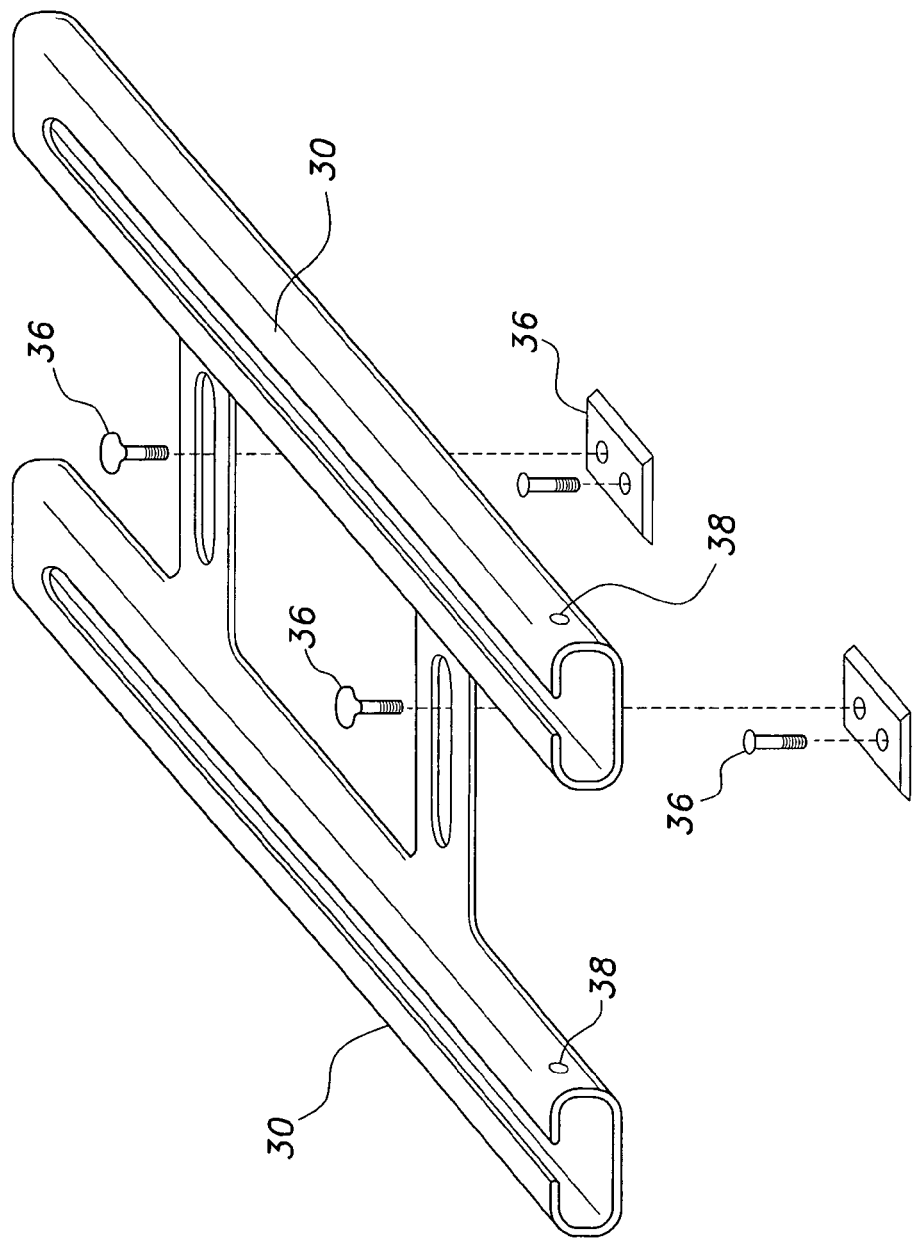
FIG. 8 is a perspective view of a parallel slide channel unit utilized with a second embodiment of a storage container according to the present invention.

FIGS. 6-8 are illustrative of a second embodiment of the invention utilizing parallel slide channels 30. Parallel channels 30 can be fabricated as a single unit and are adapted to receive parallel slide extensions 34 formed on the bottom of the container 12. Fasteners 36 are employed to attach the parallel channels to the bed of the pick-up truck. Apertures 38 are formed in the open ends of the channels to receive a lock mechanism for securing the container.

Figure 9:
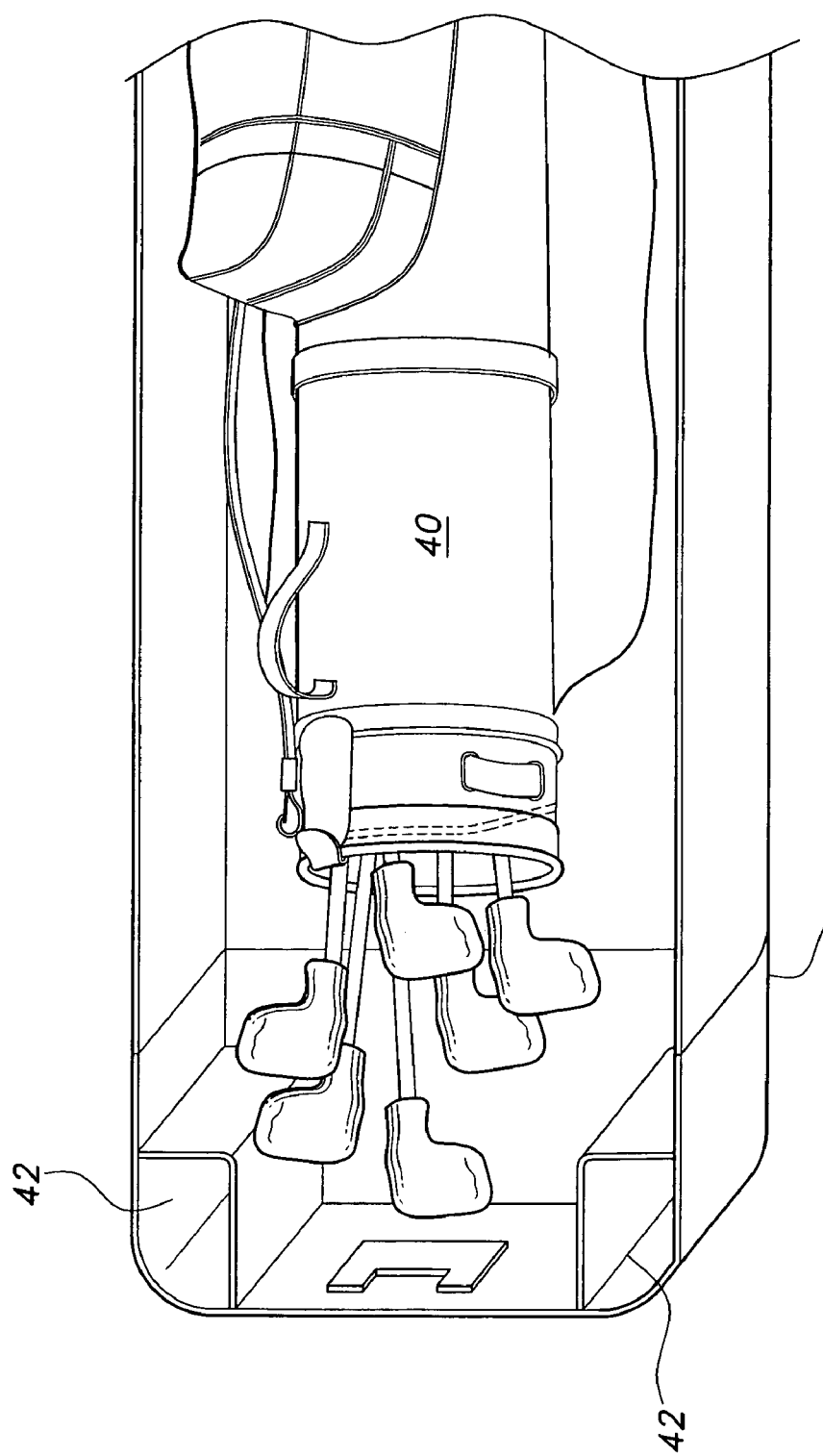
FIG. 9 is a perspective view of the lower half of a storage container according to the present invention.

FIG. 9 shows the bottom half of the container loaded with a golf bag 40 and clubs. Compartments 42 are provided for golf shoes.

It is to be understood that the present invention is not limited to the embodiments described above, but encompasses any and all embodiments within the scope of the following claims.

I claim:

1. A secure storage container for mounting in a pickup truck having a bed, comprising:
   a slide channel attached to the bed;
   a storage container, said storage container having a bottom wall;
   a slide extension formed on said bottom wall, said slide extension slidingly received in said slide channel; and
   recessed wheels disposed on said container adjacent said bottom wall.

2. The secure storage container according to claim 1, further including, a hinged lid mounted on said container.

3. The secure storage container according to claim 1, further including plural, pivoting handles attached to said container.

4. The secure storage container according to claim 1, wherein said slide channel has a first end and a second end and wherein said first end is an open end.

5. The secure storage container according to claim 1, wherein said slide channel has a first end and a second end and wherein said second end is a closed end.

6. The secure storage container according to claim 1, wherein said slide channel has a first end and a second end and wherein said first end is an open end and wherein said second end is a closed end.

7. The secure storage container according to claim 6, including a locking mechanism disposed on said slide channel adjacent said open end.

8. The secure storage container according to claim 6, further including, a hinged lid mounted on said container.

9. The secure storage container according to claim 6, further including plural, pivoting handles attached to said container.

10. A secure storage container for mounting in a pickup truck having a bed, comprising:
    a pair of slide channel attached to the bed, each slide channel having an open end and a closed end;
    a storage container, said storage container having a bottom wall;
    a pair of slide extension members formed on said bottom wall, a respective slide extension member slidingly received in a respective slide channel; and
    recessed wheels disposed on said container adjacent said bottom wall.

11. The secure storage container according to claim 10, wherein said pair of slide channels and said pair of slide extension members are respectively parallel.

12. The secure storage container according to claim 10, wherein each of said pair of said pair of slide channels has an open end for receiving a lock mechanism.

13. The secure storage container according to claim 10, further including, a hinged lid mounted on said container.

14. The secure storage container according to claim 10, further including plural, pivoting handles attached to said container.

15. A secure storage container for mounting in a pickup truck having a bed, comprising:
    at least one slide channel attached to the bed, said at least one slide channel having an open end and a closed end;
    a storage container, said storage container having a bottom portion, said bottom portion having a bottom wall and a proximate end;
    at least one slide extension formed on said bottom wall, said at least one slide extension slidingly received in said at least one slide channel;
    plural, pivoting handles attached to said container;
    recessed wheels disposed on said container adjacent said bottom wall; and
    a lid hinged to said bottom portion.

16. The secure storage container according to claim 15, wherein said proximate end of said bottom portion includes a hinged section.

17. The secure storage container according to claim 15, wherein said proximate end of said bottom portion includes a hinged section and wherein a locking mechanism is disposed on said container for locking said lid to said bottom portion.

18. The secure storage container according to claim 17, including a locking mechanism disposed on said at least one slide channel adjacent said open end.

* * * * *